June 30, 1959  L. SERVANTY  2,892,602
AIRCRAFT EJECTABLE SEAT WITH AUTOMATICALLY RELEASABLE
PERSON ATTACHING HARNESS
Filed July 23, 1953  5 Sheets-Sheet 1
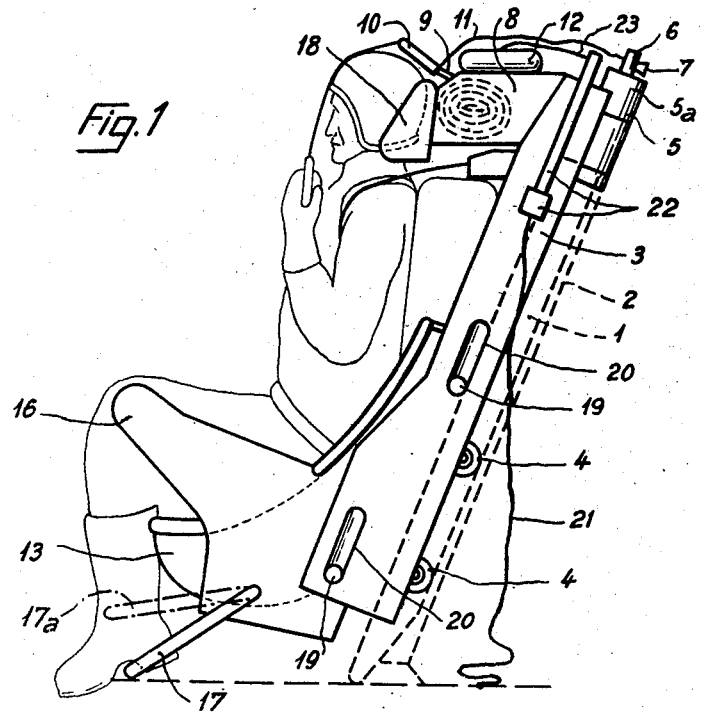
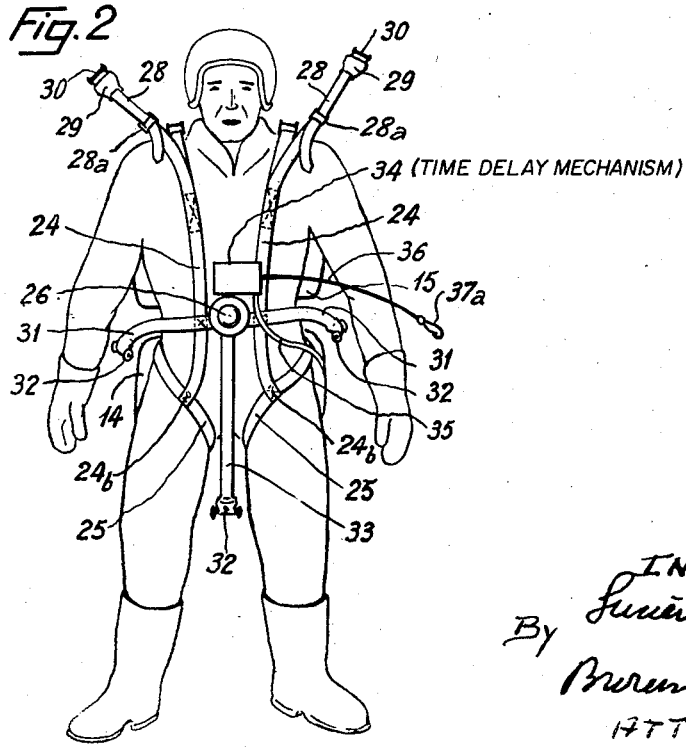
INVENTOR
ATTORNEYS June 30, 1959
L. SERVANTY
2,892,602
AIRCRAFT EJECTABLE SEAT WITH AUTOMATICALLY RELEASABLE PERSON ATTACHING HARNESS
Filed July 23, 1953
5 Sheets-Sheet 2
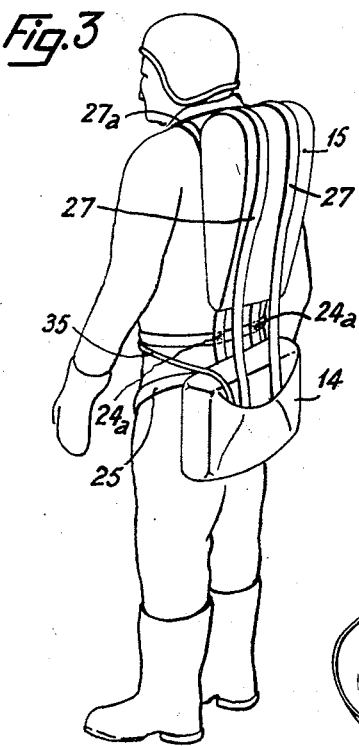
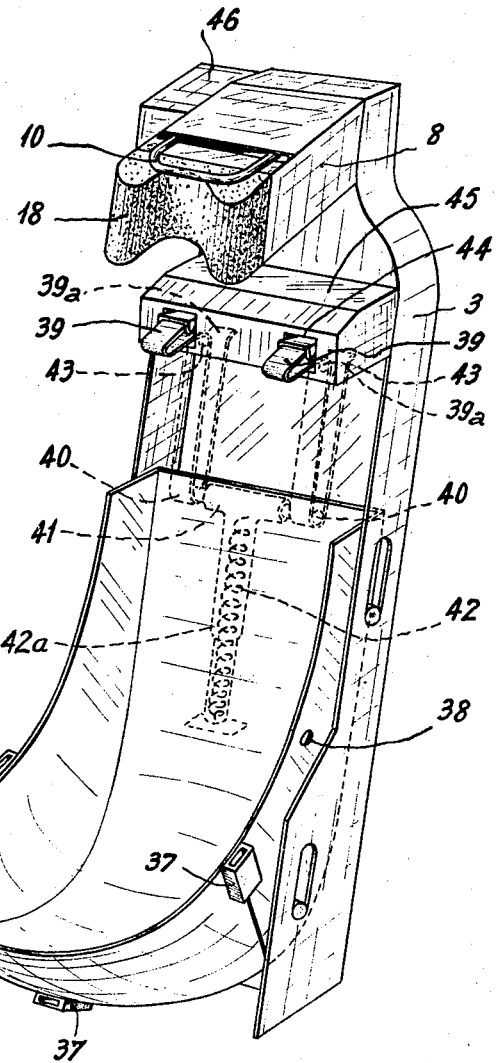
INVENTOR
Lucien Servanty
BY
Brown Seward
ATTORNEYS

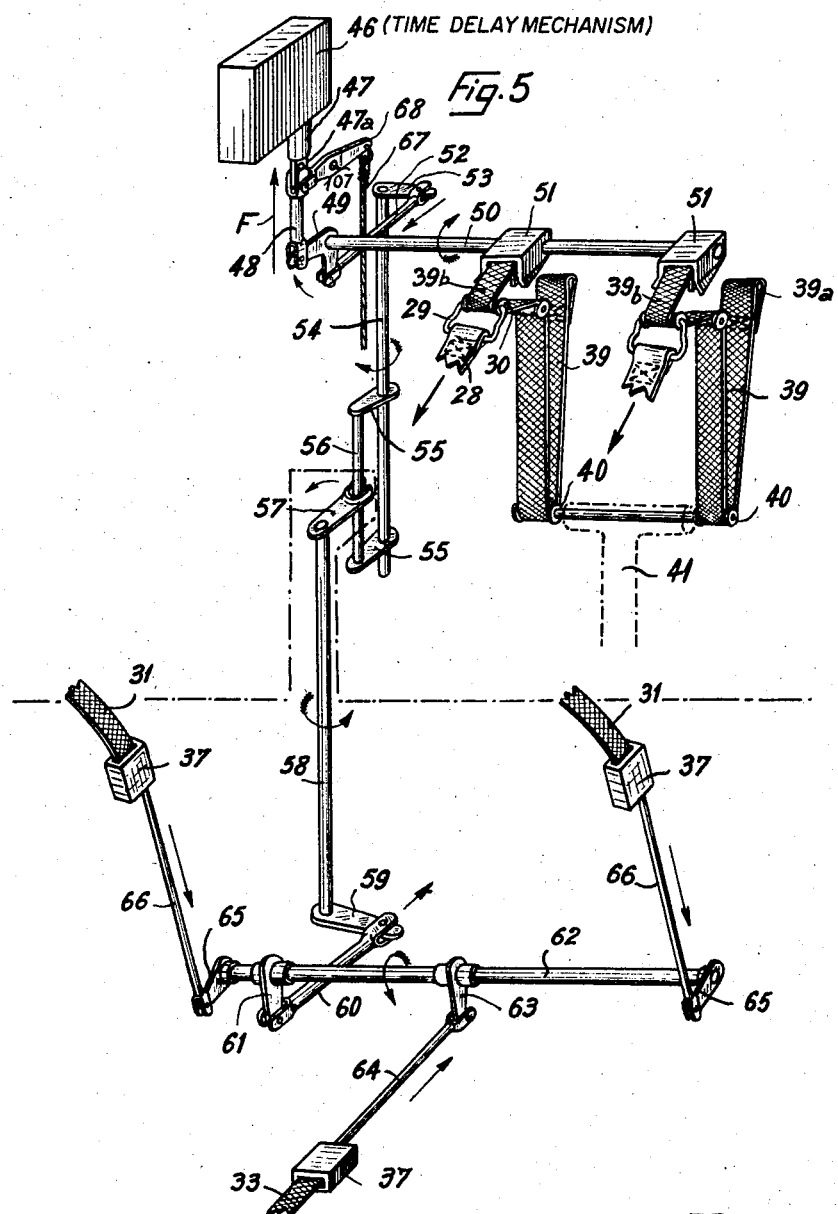

June 30, 1959 L. SERVANTY 2,892,602
AIRCRAFT EJECTABLE SEAT WITH AUTOMATICALLY RELEASABLE
PERSON ATTACHING HARNESS
Filed July 23, 1953 5 Sheets-Sheet 4
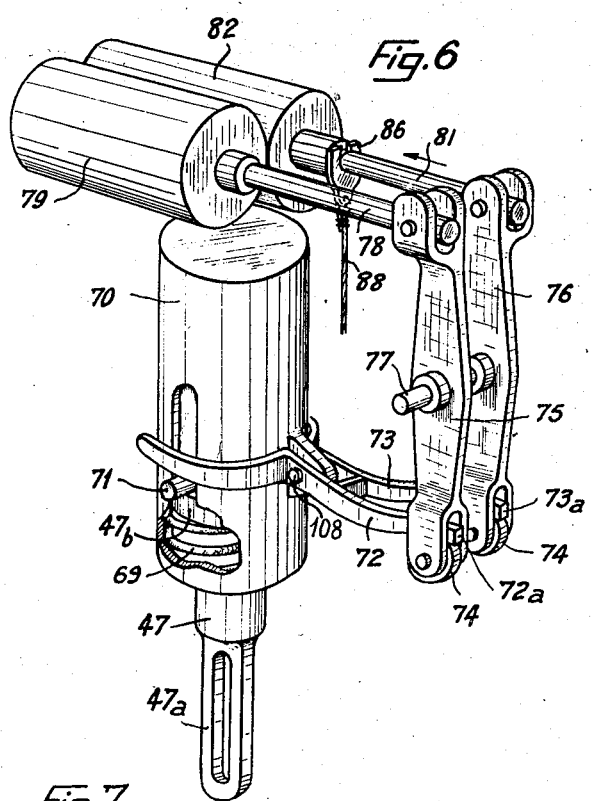
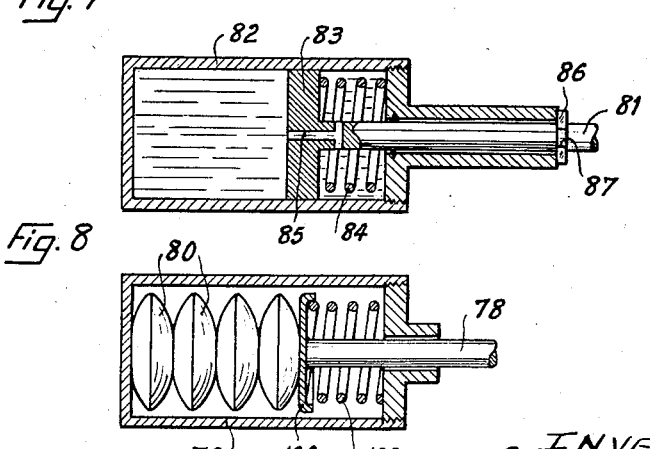

June 30, 1959 L. SERVANTY 2,892,602
AIRCRAFT EJECTABLE SEAT WITH AUTOMATICALLY RELEASABLE
PERSON ATTACHING HARNESS
Filed July 23, 1953 5 Sheets-Sheet 5
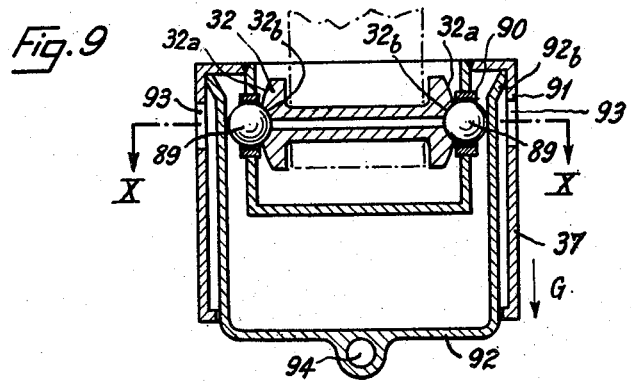
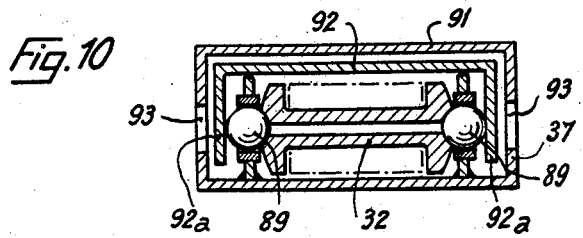
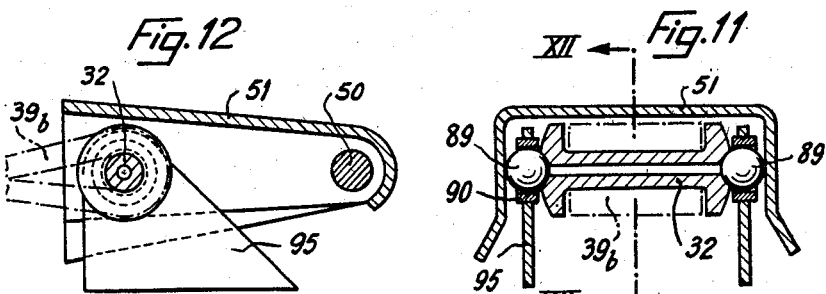
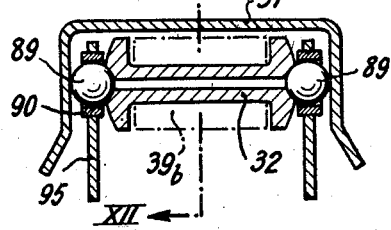
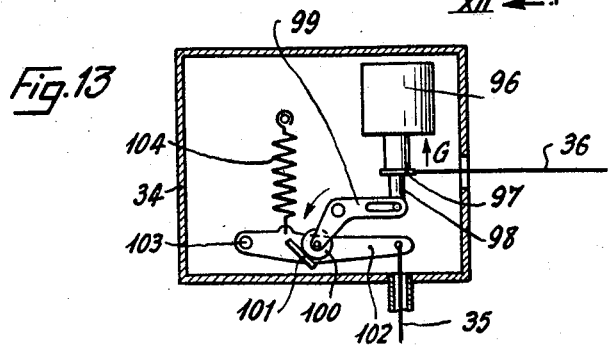

United States Patent Office 2,892,602
Patented June 30, 1959

2,892,602

AIRCRAFT EJECTABLE SEAT WITH AUTOMATICALLY RELEASABLE PERSON ATTACHING HARNESS

Lucien Servanty, Paris, France, assignor to Societe Nationale de Constructions Aeronautiques du Sud-Ouest, Paris, France, a French company Application July 23, 1953, Serial No. 369,802

Claims priority, application France July 31, 1952

4 Claims. (Cl. 244—141)

This invention relates to a system for attaching a pilot or other person occupying an aircraft on an ejectable seat, said system including a device for automatically releasing said person from said seat upon ejection from the aircraft.

It has been already proposed, for saving the life of aircraft occupants, in case of emergency, to eject said occupants with their seat, generally by means of cartridges or the like.

In this case, it is indispensable to provide a device for disconnecting the ejected person from the seat, as well as means for ensuring a safe opening of the life-parachute.

While a number of automatic devices have been proposed, heretofore, for opening the life-parachute, the disconnection of the seat is normally effected by means of a hand-control. Unfortunately, it may happen that the occupant of the seat, upon ejection, is not capable of actuating such a hand-control, which endangers his life.

The main object of this invention is to provide an aircraft with an ejectable assembly comprising a seat, a harness to be worn by the pilot, or other occupant of said aircraft for securely attaching the user on said seat, said harness being automatically releasable upon ejection of said assembly to ensure disconnection between the seat and its occupant, under the action of energy accumulating means mounted on said ejectable assembly.

Now, the disconnection between the seat and its occupant should be controlled as a function of various parameters. First of all, a certain time should elapse between ejection and disconnection to ensure safety of the ejected person.

Another object of the invention is therefore to provide an ejectable assembly of the type described including means to delay the automatic release.

Another interesting control-parameter is altitude. As a matter of fact, it is indispensable to ensure a swift descent of the ejected person, when ejection is effected at a very high altitude, so that said person does not remain a long time subjected to cold temperature and low atmospheric pressure. Moreover, it is highly desirable that said descent be effected by the ejected person while secured on the seat so as to avoid any risk of collision therewith after disconnection and so that the free descent is stabilized.

It is consequently another object of this invention to provide the above described ejectable assembly with additional locking means to prevent the automatic release from taking place above a predetermined altitude, as well as altitude-responsive means to release said locking means at said predetermined altitude, whereupon the above mentioned energy accumulating means are free to ensure the actual disconnection.

On the other hand, in the known ejectable seats, a special harness fixedly secured on the seat is provided to attach the user thereon. This additional harness is superposed to the parachute harness of the occupant of the seat, thus interfering considerably with his freedom of movement.

A further object of the invention is to use, for attaching the person to be ejected on the ejectable seat, the parachute harness proper, the latter being provided for this purpose with suitable straps removably anchored in releasable bolts fixedly secured on the seat.

A more particular object of this invention is to provide an attachment system including the above described parachute harness and resilient means to permit a certain freedom of movement to the attached person, while nevertheless ensuring safety of said attachment.

A still more particular object of the invention is to ensure anchoring of the parachute harness straps on the releasable bolts, through specially designed securing means avoiding any risk of jamming, entanglement, etc.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 1 is a diagrammatical side view of an ejectable seat with an occupant of an airplane attached thereon.

Figs. 2 and 3 are front and side views, respectively, showing the automatically releasable attachment system according to the invention, for releasably attaching an occupant of an airplane.

Fig. 4 is a perspective view of an ejectable seat according to the invention.

Fig. 5 is another perspective view showing the controls and linkages for releasing the attaching straps and tabs from their anchoring means on the seat.

Fig. 6 is a perspective view of a double-lock automatic release control according to the invention.

Fig. 7 is a longitudinal sectional view of a spring-controlled dash-pot for delaying the automatic release.

Fig. 8 shows in a similar manner an aneroid device for preventing the release mechanism from operating above a predetermined altitude.

Fig. 9 is a longitudinal sectional view of one of the tab anchoring thimbles.

Fig. 10 is a sectional view along line X—X of Fig. 9.

Fig. 11 is a cross-sectional view of an anchoring thimble similar to that shown in Fig. 9, used for removably attaching the shoulder straps.

Fig. 12 is a sectional view along line XII—XII of Fig. 11, and

Fig. 13 is a diagrammatical view of the mechanism used for ensuring automatic opening of the life-parachute.

In Fig. 1, the ejectable parts of the seat are shown in full lines, the occupant of the seat and his personal equipment are shown in thin lines, and the parts of the seat which are fixedly secured on the airplane are shown in dotted lines.

These fixedly secured parts essentially comprise a rolling track 1 and the ejection gun 2. The ejectable seat proper comprises a frame 3 provided with rollers 4 adapted to roll on track 1. A tube 5, attached on said frame constitutes the projectile to be ejected by gun 2. In the head 5a of said tube, are housed a load of powder and the firing member 6 which may be operated by means of a gudgeon-pin 7. The upper portion of frame 3 carries a box 8 in which is stored a wound screen 9 provided with a handle 10. A pulling cable 11 secured to said handle 10 is provided for removing the gudgeon-pin 7. The top wall of box 8 carries the seat stabilizing parachute pack 12. The lower portion of frame 3 carries a bucket seat 13. The seat and back cushions are constituted by the life-parachute 14 and a pneumatic life-boat 15 contained in suitable bags and worn by the occupant of the seat by means of an appropriate harness. The bucket seat 13 is provided with lateral plates 16 acting as knee-rests and with foot-rests 17 on which the occupant of the seat must hook his heels prior to ejection, said foot-rests 17 normally assuming the elevated position shown at 17a. In this seat, the position of the head-rest 18 is fixed and determines the position of the head of the occupant of the seat while, to take into account the size of said occupant, bucket seat 13 is adjustable in height by means of a lever, not shown, with respect to frame 3, guided by rollers 19 provided on said bucket and slidably engaged in slots 20 of frame 3.

As known, an ejectable seat of this type operates as follows:

In case of emergency, the occupant of the seat, after having hooked his heels on the foot-rests 17, grips handle 10 and lowers screen 9 in front of his face. This causes actuation of the firing-member 6 and the seat is ejected out of the aircraft. When the seat has separated from the airplane by a certain distance, cable 21, one end of which is secured to the airplane while its other end is anchored on the firing member of an auxiliary gun 22, operates said firing member, so that said gun is fired and projects into the space a tubular member on which is secured another cable 23 adapted to ensure opening of the seat stabilizing parachute. When opened, said parachute opposes the rotary motion which tends to be imparted to the seat after a certain time of free descent. Then, in the prior art apparatus, the occupant of the seat detaches the harness through which he was attached on the seat and opens his life-parachute.

According to the invention, the disconnection of the seat from its occupant is automatic, so that it is ensured even if said occupant is incapable of effecting a manual operation.

As mentioned in the preamble, the ejectable seat is preferably not provided with any harness and the personal harness of the occupant is adapted to be removably attached to the seat.

As shown in Figs. 2 and 3, said personal harness comprises two shoulder straps 24, having their rear ends 24a secured to the upper edge of the life-parachute pack 14. The front ends 24b of the shoulder straps are respectively secured to thigh straps 25, the ends of which are also secured to pack 14. The shoulder straps 24 are interconnected at the level of the belt by means of a belt-buckle 26. The suspension lines 27 of the parachute contained in pack 14 pass over the bag 15 containing the pneumatic life-boat, that may be attached to the rear portion of the shoulder strap 24. Said suspension lines 27 are secured at 27a to straps 24 on the shoulders of the user.

The above-described harness is completed by five tabs for attachment to the ejectable seat. The two upper tabs 28 are secured to the straps 24 at the level of the chest. They are provided with buckles 28a for adjusting their length. They are terminated by widely-opened thimbles 29 provided with a wide-grooved pulley 30. The tabs 31 are hooked on the buckle 26 and are terminated by bobbins 32 described in detail hereafter. The last tab 33 is also hooked on the belt-buckle 26, this last tab passing between the legs of the pilot and also terminating at a bobbin 32.

This harness also comprises an automatic parachute opening device housed in a box 34 secured, e.g. on buckle 26 and including a Bowden cable 35 adapted to open pack 14 and an actuating rope 36 terminated by a snap-hook 37a for attachment to the bucket-seat. Cable 36 may be duplicated, if required, by a second cable (not shown) terminated by a handle permitting hand-control of the parachute opening in case of a failure of the automatic opening device housed in box 34 that will be described hereunder.

Fig. 4 shows the attaching arrangements provided on the seat in particular for the above-described tabs of the harness.

The side tabs 31, as well as the lower tab 33, are adapted to be locked in thimbles 27, one embodiment of which will be described with reference to Figs. 9 and 10. The snap-hook 37a is adapted to be anchored in an eyelet 38 provided for this purpose in a side wall of the bucket-seat. Finally, the pulleys of thimbles 29 terminating the tabs 28 are each engaged in a loop of a supple band 39. The essential purposes of bands 39 are to permit a certain free motion of the shoulders of the occupant of the seat, prior to ejection, and to press and hold the shoulders of said occupant flat against the back of the seat when desired and, in particular, during ejection. For these purposes, one end 39a of each band 39 is fixedly secured to anchoring means on frame 3. Each band 39 passes over a spool-shaped pulley 40. Pulleys 40 are journalled on the lateral arms of a T-shaped member 41 which is continuously urged downwards under the action of a spring 42 the lower end of which is anchored on frame 3; said bands then pass over pulleys 43 and project through cut-off portions 44 out of a box 45 secured to frame 3 to pass over the pulleys 30 of the thimbles 29. In said box, the free ends of the bands 39 are detachably anchored in the manner described hereafter with reference to Fig. 5, as well as to Figs. 11 and 12. Under the action of spring 42, the bands 39 are held continuously taut and exert a pulling stress on the shoulder tabs 28. The occupant of the seat is thus capable of leaning forwards to a certain extent, while his shoulders are continuously urged towards the back of the seat. However, the guiding telescoping tubes 42a of spring 42 can be locked in any adjustment position by means of a suitable mechanism (not shown) which permits, during flight, releasing the pilot from the traction of the shoulder bands and, during ejection, preventing spring 42 from yielding under the stress exerted due to the inertia of the pilot body on the shoulder straps 27.

The five locks controlling respectively the five tabs of the harness are actuated from an energy accumulator enclosed within a box 46 secured on one side of frame 3.

Fig. 5 is a developed view of the linkage controlling the locks.

As shown in Fig. 5, the energy accumulator contained in box 46, which in the example shown is constituted by a spring 69 (Fig. 6), is adapted to exert on a sliding member 47 a stress acting in the direction of arrow F. Said sliding member 47 is provided with a stud-hole 47a in which is engaged the crank-pin of a connecting-rod 48, the other end of which is articulated on bell-crank lever 49. The latter is fast with one end of a spindle 50 journaled in box 45 on which are keyed the locking members 51 of anchoring bolts for the upper ends 39b of the bands 39. The other arm of the bell-crank lever 49 is linked through a connecting-rod 52 with a crank-arm 53 fast with one end of a spindle 54 journaled in frame 3. On said spindle are keyed two parallel crank arms 55 interconnected through a cross-bar 56 on which is engaged a bracket 57 fast with a spindle 58 journaled in bearings embedded in the bucket seat. The lower end of said spindle 58 carries a crank-arm 59 linked through a connecting rod 60 to a crank-arm 61 keyed on a spindle 62 extending transversally with respect to the bucket seat and journaled in bearings embedded in the same. On said spindle is also keyed a crank-arm 63 linked through a connecting-rod 64 to an anchoring box 37 for the tab 33 and two crank-arms 65 linked each through a connecting rod 66 to one of two anchoring-boxes 37 for the lateral tabs 31.

In the developed diagram of Fig. 5, for the sake of clearness, a broken dot-dash line separates the portions of this transmission which are solid with the bucket seat from those which are fast with frame 3. The interconnection between both parts of the system is continuously maintained, when the height of the seat is varied, by the sliding engagement of the bracket 57 along the cross-bar 56.

As the sliding member 47 is moved in the direction of arrow F, the linkage is actuated, as shown in the drawing by different arrows, so that bar 50 rotates around its own axis to lift the harness locking members 51 while tractions are exerted on rods 64 and 66 to thereby release tabs 31—33 from the locking thimbles 37. The lateral tabs 31 and the lower tab 33 are then released from the bucket seat while the ends 39b of the bands 39 are released from the frame. As a result, said bands are free to escape through the thimbles 29. The occupant of the seat is thus disconnected from the latter.

In the case of a gripping of the sliding member 47, the release may be effected manually by pulling the cable 67 by means of a suitable hand-control. Said cable 67 is attached to one end of a lever 68 which is pivoted at 107 and articulated on the connecting-rod 48 and which, due to the presence of the stud-hole 47a, is capable of moving said connecting rod without displacing the sliding member 47. The energy accumulating mechanism contained in the control box 46 is shown in detail in Fig. 6.

The sliding member 47 which is terminated at its upper end by a piston 47b is subjected to the action of an energy accumulating spring 69 enclosed within a cylinder 70. The extension of the the spring 69 and the displacement of piston 47b in said cylinder are opposed by two pins 71 provided for this purpose on piston 47b and which are urged by spring 69 into abutment with a lever having two arms 72 and 73, respectively and pivoted at 108. The shanks 72a and 73a of said arms are engaged in yokes at the end of levers 75 and 76 in contact with rollers 74. Said levers 75—76 are pivoted around a common spindle 77, this arrangement of pivoted levers and arms constituting a lock device which comprises the members named. The upper end of lever 75 is connected with a rod 78 which, as shown in Fig. 8 enters a cylinder 79 and the inner end of which, solid with a washer 106 is pressed against a stack of pressure-responsive diaphragm-cases 80 enclosed in said cylinder. On the other hand, the upper end of lever 76 is articulated on a rod 81 entering a cylinder 82 partly filled with a liquid. The inner end of rod 81 is fast with a piston 83 subjected to the action of a spring 84 urging the said piston in the direction to unlock the lock device. The two compartments of cylinder 82 separated from each other by the piston 83 communicate through a narrow calibrated port 85. Rod 81 is normally prevented from moving by a detachable lock means comprising a U-shaped key 86, the arms of which are engaged into diametrically opposed notches 87 provided, for this purpose, in rod 81 and which is attached through a cable 88 on a fixed part of the airplane.

This device operates as follows:

Upon ejection of the seat, cable 88 removes key 86 from rod 81. Piston 83 then begins to move under the thrust of spring 84 in cylinder 82 to thereby retract rod 81. The presence of the liquid in the cylinder gives rise to a dash-pot decelerating action and the port 85 is so calibrated that about ten seconds are required for displacing lever 76, through rod 81, by a sufficient angle to release the shank of the lever-arm 73 and, thence, piston 47b.

On the other hand, the pressure-responsive diaphragm cases 80 only release the lever-arm 72 when the external pressure is sufficiently high to flatten said cases, so as to permit extension of spring 105, in other words, when a sufficiently low altitude has been reached.

Thus, the extension of spring 69, and, thence, the disconnection of the seat from its occupant under the traction exerted by the sliding member 47 requires two conditions fulfilled by levers 75 and 76, respectively:

(1) the lapse of a certain time after ejection.

(2) a descent down to a sufficiently low altitude.

It is clear that with airplanes permanently flying under 16,000 ft. for example, it is not necessary to control the release of the seat attachments as a function of altitude.

In Figs. 9 and 10, is shown a constructive embodiment of the locks 37 provided for anchoring bobbins 32 and, hence, the ends of the straps 31 and 33, to which are attached said bobbins.

Bobbins 32 are terminated by spherical cups 32a in the central portion of which is provided a spherical recess 32b. In recesses 32b are housed balls 89 which are held in bearings constituted by short sleeves 90 secured in a re-entrant portion of casing 91 that constitutes the exposed portion of lock 37. In said casing is slidably mounted a U-shaped member 92, the arms 92a of which bear upon the surfaces of balls 89, thus holding said balls in recesses 32b and, thence, bobbins 32 in lock 37.

To make mounting easier, the U-shaped members 92 terminate in a flared portion 92b and lateral openings 93 are provided to accommodate the balls 89. The eyelet 94 which is provided at the lower end of each U-shaped member 92 permits securing the same to one of the traction rods 64 or 66.

It will be easily understood that, upon a traction exerted in the direction of arrow G on member 92, the casing of lock 37 being secured on a fixed part, the balls 89 and, thence, the bobbins 32, are released.

The design and operation of the anchoring bolts of the ends 39b of the bands 39 are similar (Figs. 11 and 12).

The bobbin 32 secured to the end 39b of a band 39 is anchored on balls 89, the bearings 90 of said balls being carried on a support 95 fixedly secured on box 45. The locking stirrup member 51 is normally engaged on balls 89 on either side of bobbin 32. Upon rotation of spindle 50, member 51 is lifted and balls 89 and, hence, bobbin 32, are released.

The box 34 shown in Fig. 13 contains a retarding device 96, the design of which is similar to that shown in Fig. 7. The cord 36 is terminated by a U-shaped key 97 similar to key 86. The movable member 98 of the retarding device 96 is articulated on a bell-crank lever 99 terminated by a roller 100. Said roller rolls on a slope 101 supported by a lever 102 pivoted at 103 and subjected to the action of a spring 104 which constitutes a second energy accumulator similar to spring 69 of Fig. 6. At the end of said lever is attached the end of a cable 35 provided for opening the life-parachute.

When the pilot is disconnected from his seat, a traction is automatically exerted upon cable 36, which causes removal of key 97; the retarding device 96 is then operated. Upon being displaced in the direction of arrow G, member 98 causes anti-clockwise tilting of lever 99, roller 100 leaves the slope 101, spring 104 retracts and pulls cable 35. Due to the delaying action ensured by device 96, the pilot and his seat have been then separated in space by a sufficiently material distance, so that the opening of the parachute is not impaired by the presence of the seat.

While the invention has been described with particular reference to a preferred embodiment, it is not intended to limit the scope of the invention to the embodiment illustrated, nor otherwise than by the terms of the subjoined claims.

What is claimed is:

1. In combination with an ejectable assembly for aircraft comprising an ejection seat, a harness, a parachute pack attached to said harness and including parachute opening means, a time delay mechanism attached to said harness for actuating said parchute opening means and including a detachable lock means for normally locking said time delay mechanism, releasable connections between said harness and said seat, and a power mechanism to release the harness from the seat; a lock device to lock said power mechanism against actuation, spring pressed means urging said lock device to unlock, a barostat device for controlling the action of said spring in accordance with the pressure of the atmosphere, a connection between said seat and said detachable lock means of the time delay mechanism to detach said lock means from the time delay mechanism upon release of the harness from the seat, and a detachable means on said lock device to hold the latter in locking position before ejection of the seat and connected to the aircraft so as to be detached from said lock device upon ejection of the seat to thereby allow said power mechanism to release the harness from the seat and to subsequently allow said time delay mechanism to become operative as its detachable lock means is detached upon release of the harness from the seat.

2. In combination with an ejectable assembly for aircraft comprising an ejection seat, a stabilizing parachute pack attached to said seat, means for causing said stabilizing parachute to open as the seat is ejected from the aircraft, a harness, a personal parachute pack attached to said harness and including parachute opening means, releasable connections between said harness and said seat, and a power mechanism to release the harness from the seat; a lock device to lock said power mechanism against actuation, spring pressed means urging said lock device to unlock, a barostat device for controlling the action of said spring in accordance with the pressure of the atmosphere, a connection between said seat and said parachute opening means for causing the personal parachute to open as said harness is released from said seat, and a detachable means on said lock device to hold the latter in locking position before ejection of the seat and connected to the aircraft so as to be detached from said lock device upon ejection of the seat to thereby allow said power mechanism to release the harness from the seat as said stabilizing parachute has been caused to open, and to cause said personal parachute to open after said harness has been released from said seat.

3. In an ejectable assembly for aircraft comprising an ejection seat, a harness, releasable connections between said harness and said seat, and a power mechanism to release the harness from the seat; a movable lock member to lock said power mechanism against actuation, a fluid containing cylinder, a piston reciprocable therein and provided with a fluid passage, a piston rod extending from one face of said piston through one end of said cylinder and connected to said movable lock member to move the same in correspondence with the sliding motions of said piston, spring means within said cylinder urging said piston and thereby said movable lock member in a direction to release said power mechanism, a barostat device connected to said movable lock member for controlling the action of said spring means in accordance with the pressure of the atmosphere, and a detachable clip member on said piston rod arranged to hold said piston in locking position before ejection of said seat and connected to the aircraft so as to be detached from said piston rod upon ejection of the seat to thereby release said piston and said movable lock member.

4. The combination with an ejectable assembly for aircraft comprising an ejection seat, a harness, a parachute pack attached to said harness and including parachute opening mens, releasable lock means carried by said seat for locking said harness thereto, and an ejection gun to eject said seat with said harness locked thereto, of a seat stabilizing parachute permanently secured to said seat, means for causing said seat stabilizing parachute to open as the seat is ejected from the aircraft, detachable release means for said lock means connected to said aircraft so as to be detached from said lock means upon ejection of said seat to thereby release said lock means and consequently release said harness from said seat, a time delay mechanism attached to said harness for actuating said parachute opening means, and a detachable lock means in said time delay mechanism for normally locking the same, said detachable lock means being connected to said seat so as to be detached from said time delay mechanism upon release of said harness from said seat, and said time delay mechanism being adapted to actuate said parachute opening means with a predetermined delay after said detachable lock means has been detached therefrom.

References Cited in the file of this patent

UNITED STATES PATENTS

| | | |
|---|---|---|
| 1,800,575 | Tofflemire | Apr. 14, 1931 |
| 1,843,597 | Coffman | Feb. 2, 1932 |
| 2,114,897 | Bird et al. | Apr. 19, 1938 |
| 2,527,020 | Martin | Oct. 24, 1950 |
| 2,542,248 | Hefferman et al. | Feb. 20, 1951 |
| 2,569,638 | Martin | Oct. 2, 1951 |
| 2,680,476 | Saffell | June 8, 1954 |